United States Patent
Noguchi et al.

(10) Patent No.: US 8,981,309 B2
(45) Date of Patent: Mar. 17, 2015

(54) CASSETTE FOR DETECTING RADIATION AND CONVERTING DETECTED RADIATION INTO DIGITAL IMAGE DATA

(75) Inventors: Shinsuke Noguchi, Kanagawa (JP); Takeyasu Kobayashi, Kanagawa (JP); Makoto Sugizaki, Kanagawa (JP)

(73) Assignee: Fujifilm Corporation, Tokyo (JP)

( * ) Notice: Subject to any disclaimer, the term of this patent is extended or adjusted under 35 U.S.C. 154(b) by 217 days.

(21) Appl. No.: 13/600,017

(22) Filed: Aug. 30, 2012

(65) Prior Publication Data
US 2013/0077764 A1    Mar. 28, 2013

(30) Foreign Application Priority Data
Sep. 28, 2011 (JP) ................. 2011-213315

(51) Int. Cl.
*A61B 6/00* (2006.01)
*G01T 1/20* (2006.01)
*G03B 42/04* (2006.01)

(52) U.S. Cl.
CPC .. *G01T 1/20* (2013.01); *G03B 42/04* (2013.01)
USPC ............ 250/370.08; 250/370.01; 250/370.09; 378/167; 378/169; 378/177; 378/178; 378/180

(58) Field of Classification Search
USPC .......... 250/370.01, 370.08, 370.09; 378/167, 378/169, 177, 178, 180, 189
See application file for complete search history.

(56) References Cited

U.S. PATENT DOCUMENTS

| | | | |
|---|---|---|---|
| 6,928,145 B2 * | 8/2005 | Kobayashi | 378/117 |
| 7,046,764 B1 * | 5/2006 | Kump | 378/117 |
| 7,127,032 B1 * | 10/2006 | Kump | 378/117 |
| 7,164,137 B2 * | 1/2007 | Hayashida | 250/370.11 |
| 7,244,945 B2 * | 7/2007 | Okada et al. | 250/370.11 |
| 7,304,309 B2 * | 12/2007 | Suhami | 250/370.11 |
| 7,317,190 B2 * | 1/2008 | Ertel et al. | 250/370.11 |
| 7,435,967 B2 * | 10/2008 | Ertel et al. | 250/370.11 |
| 7,478,947 B2 * | 1/2009 | Kobayashi | 378/181 |
| 7,488,946 B2 * | 2/2009 | Hennessy et al. | 250/370.09 |
| 7,495,227 B2 * | 2/2009 | Hennessy et al. | 250/370.09 |

(Continued)

FOREIGN PATENT DOCUMENTS

| | | |
|---|---|---|
| JP | 2002-048873 | 2/2002 |
| JP | 2006-133126 | 5/2006 |

(Continued)

OTHER PUBLICATIONS

Japanese Office Action issued by the Japanese Patent Office on Oct. 7, 2014 in the corresponding Japanese Patent Application No. 2011-213315.

*Primary Examiner* — David A Vanore
(74) *Attorney, Agent, or Firm* — Jean C. Edwards, Esq.; Edwards Neils PLLC

(57) ABSTRACT

A cassette includes: an image capturing unit including: an image receiving unit having a flat panel shape on which a plurality of pixels are arranged on a substrate converting radiation into electric charges and accumulating the converted electric charges; and a support to which the image receiving unit is attached; and a case in which the image capturing unit is accommodated in an unfixed state, in which the support supports the image receiving unit, and an outer edge of the support is disposed on an outer side of an outer edge of the substrate of the image receiving unit in a direction parallel to an image receiving surface of the image receiving unit.

14 Claims, 7 Drawing Sheets

(56) References Cited

U.S. PATENT DOCUMENTS

| | | | |
|---|---|---|---|
| 7,718,974 B2 * | 5/2010 | Schulz et al. | 250/370.11 |
| 7,866,163 B2 * | 1/2011 | Ertel | 62/3.2 |
| 8,304,735 B2 * | 11/2012 | Inoue et al. | 250/361 R |
| 8,360,638 B2 * | 1/2013 | Ohta et al. | 378/190 |
| 8,431,902 B2 * | 4/2013 | Nakatsugawa et al. | 250/361 R |
| 8,664,607 B2 * | 3/2014 | Iwakiri et al. | 250/361 R |
| 8,742,356 B2 * | 6/2014 | Iwakiri et al. | 250/366 |
| 2004/0211911 A1 * | 10/2004 | Hata | 250/370.11 |
| 2008/0078939 A1 | 4/2008 | Hennessy et al. | |

FOREIGN PATENT DOCUMENTS

| | | |
|---|---|---|
| JP | 2006-311575 A | 11/2006 |
| JP | 2008-090304 | 4/2008 |
| JP | 2010-127882 A | 6/2010 |
| JP | 2011-090024 A | 5/2011 |

* cited by examiner

CASSETTE FOR DETECTING RADIATION AND CONVERTING DETECTED RADIATION INTO DIGITAL IMAGE DATA

CROSS-REFERENCE TO RELATED APPLICATIONS

This application is based on and claims priority under 35 USC 119 from Japanese Patent Application No. 2011-213315 filed on Sep. 28, 2011; the entire content of which is incorporated herein by reference.

BACKGROUND OF THE INVENTION

1. Technical Field

The present invention relates to a cassette that detects radiation such as X-rays, and converts the detected radiation into digital image data.

2. Related Art

An X-ray imaging has been widely used in the fields of medical diagnosis or nondestructive inspection. In a general X-ray imaging, X-rays are irradiated to a subject and attenuated at every part of the subject. Then, X-rays transmitted through the subject are detected to obtain X-ray images based on the intensity distributions of X-rays.

As an X-ray detecting medium, there have been used, for example, a combination of an intensifying screen which generates fluorescence when exposed to X-rays and a film photosensitive to the fluorescence, or a photostimulable phosphor (accumulative phosphor) panel that accumulates the intensity distributions of X-rays as latent images when exposed to X-rays and emits fluorescence in accordance with the latent images by a subsequent irradiation of an excited light such as laser.

Recently, a flat panel detector (FPD) has also been used as an X-ray detecting medium, which generates digital image data by using a semiconductor device that detects X-rays and converts the detected X-rays into an electric signal.

Further, a so-called cassette configured to accommodate the detecting medium in a portable case has been widely used in an X-ray imaging. In many cases, this type of cassette is exposed to a load or an impact due to the form of usage.

For example, in a cassette disclosed in Patent Document 1 (JP-A-2006-311575), a buffer material such as air sac is provided throughout the gap formed between the case and the detecting medium in order to protect the detecting medium from the load or the impact.

SUMMARY OF THE INVENTION

In the cassette disclosed in Patent Document 1, buffer material such as air sac is provided between the case and the detecting medium, and the detecting medium is protected from the impact during, for example, a transport. However, when the cassette is subject to an impact, the detecting medium moves more than necessary, and the case may be in contact with the detecting medium.

Specifically, the cassette is formed to be a thin panel and the thickness is only a few centimeters. Therefore, when the detecting medium is in contact with the case, the detecting medium can be easily damaged.

When the cassette is transported in medical practice, the cassette may be accidently dropped. In this case, since the cassette is formed to be a thin panel, the cassette may collide with a bed from a side wall part of the case. For this reason, it is preferable to provide a measure for an impact applied to the detecting medium through the side wall part of the case.

An illustrative aspect of the invention is to provide a cassette having an enhanced impact resistance by providing a measure for a weakness to impact caused by the shape of the cassette.

According to an aspect of the invention, a cassette includes: an image capturing unit including: an image receiving unit having a flat panel shape on which a plurality of pixels are arranged on a substrate converting radiation into electric charges and accumulating the converted electric charges; and a support to which the image receiving unit is attached; and a case in which the image capturing unit is accommodated in an unfixed state, in which the support supports the image receiving unit, and an outer edge of the support is disposed on an outer side of an outer edge of the substrate of the image receiving unit in a direction parallel to an image receiving surface of the image receiving unit.

According to the above cassette, when the cassette is subject to an impact, since the support that supports the image receiving unit is formed to be bigger than the image receiving unit, the impact is not directly applied to the image receiving unit, such that the substrate of the image receiving unit is hardly damaged. That is, by providing the measure for the weakness to impact caused by the shape of the cassette, it is possible to obtain a cassette having an enhanced impact resistance.

DETAILED DESCRIPTION OF EMBODIMENTS OF THE INVENTION

Figure 1A:
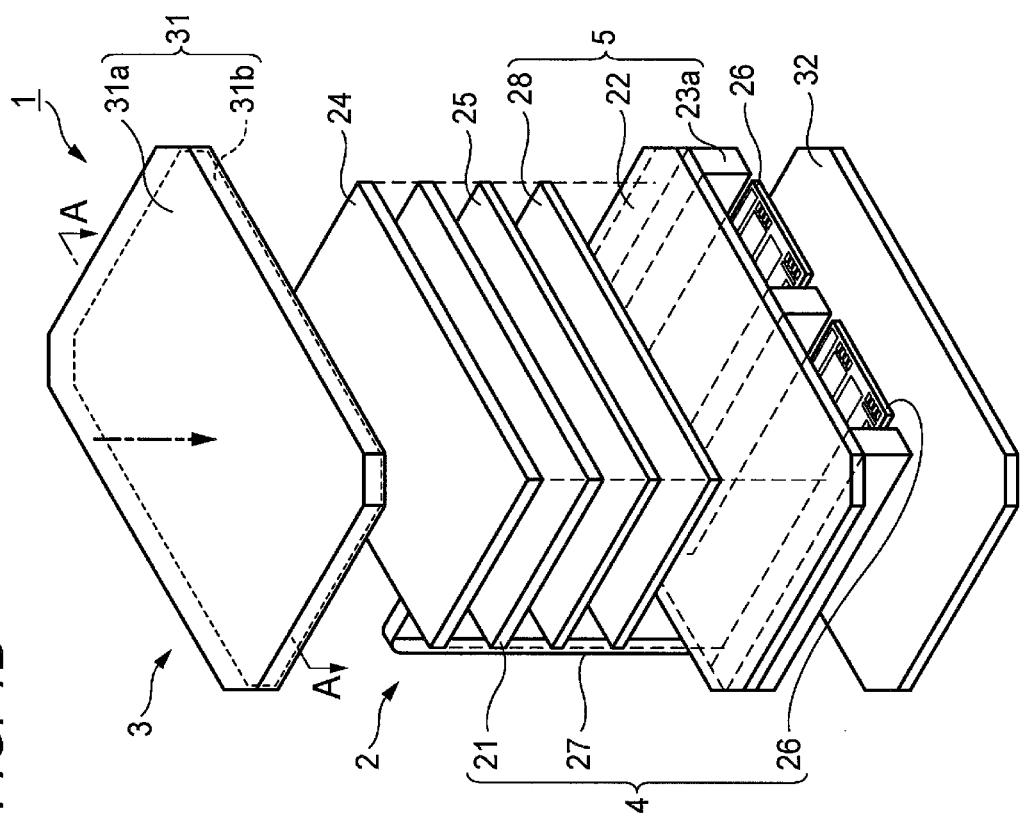
FIGS. 1A and 1B are exploded views schematically illustrating the configurations of cassettes according to exemplary embodiments of the present invention.
Figure 1B:
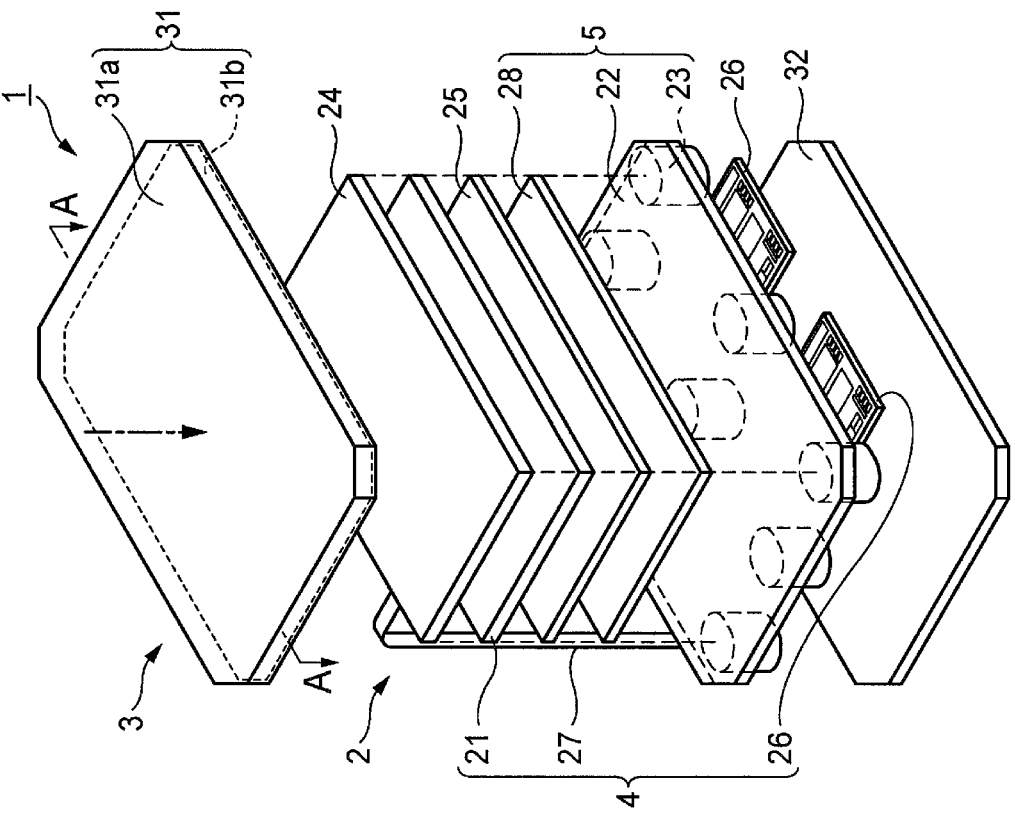
Figure 2:
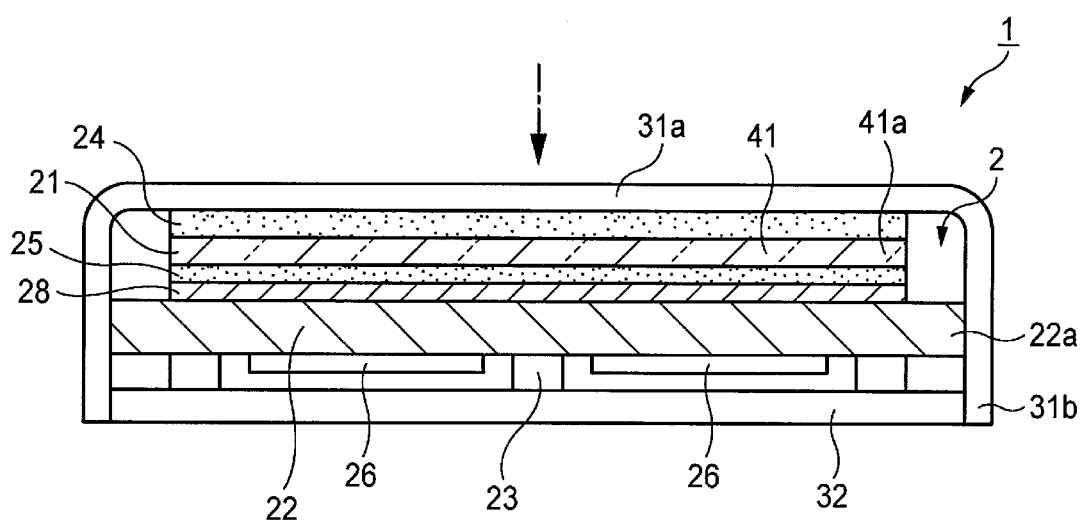
FIG. 2 is a cross-sectional view taken along the line A-A of the cassette of FIG. 1A.

FIGS. 1A and 1B are exploded view schematically illustrating the configurations of cassettes according to exemplary embodiments of the present invention and FIG. 2 is a cross-sectional view taken along the line A-A of the cassette of FIG. 1A (or FIG. 1B).

A cassette 1 includes an image capturing unit 2 having an FPD4 as an X-ray detecting medium and a support 5 that supports the FPD4, and a case 3 that accommodates the image capturing unit 2 in an unfixed status. The cassette 1 further includes a battery pack (not illustrated) that supplies an operating power to an FPD4 of the image capturing unit 2 (see FIG. 1A).

The unfixed state refers to a state where the image capturing unit 2 is not bonded to the case 3. For example, the unfixed state excludes a state where the image capturing unit 2 is adhered to the case 3 with an adhesive, and a state where the image capturing unit 2 is fixed to the case 3 through a fastening unit such as a screw.

The case 3 is constituted with a front member 31 including a substantially rectangular ceiling plate part 31a and a frame-shaped side wall part 31b vertically formed on four side edges of the ceiling plate part 31a, and a back member 32 having a flat panel shape and closing a bottom part opening of the front member 31. As the back member 32 is fitted into the front member 31, a box shaped closed space which is light-shielded is formed, and the image capturing unit 2 is accommodated in the closed space.

X-rays transmitted through a subject are transmitted through the ceiling plate part 31a of the front member 31 to be incident to the image capturing unit 2 accommodated inside the case 3. The ceiling plate part 31a is formed of a material having an excellent X-ray transmissivity, and typically formed of a light metal material such as aluminum or magnesium, or a resin material such as carbon fiber reinforced plastics (CFRP) in consideration of, for example, a strength-to-weight ratio.

As described above, in the cassette 1, the side wall part 31b of the front member 31 and the ceiling plate part 31a are integrally formed by the same material. As a result, the strength of the front member 31 is improved, and specifically, the torsional resistance of the ceiling plate part 31a is improved.

When aluminum or magnesium is used as a material to form the ceiling plate part 31a and the side wall part 31b as described above, the ceiling plate part 31a and the side wall part 31b may be integrally formed by, for example, a die-cast molding. Further, when the CFRPs are used, the ceiling plate part 31a and the side wall part 31b may be integrally formed by, for example, a compression molding.

As illustrated in FIG. 1A, by integrally forming the ceiling plate part 31a and the side wall part 31b, four corners of the front member 31 are chamfered.

The back member 32 is also formed using typically a light metal material such as aluminum or magnesium, or the resin material such as CFRP in consideration of the strength-to-weight ratio.

The structure of the case 3 is not limited to the structure illustrated in FIG. 1A. For example, instead of the front member 31, the back member 32 may have the side wall part. Alternatively, both the front member 31 and the back member 32 may have side wall parts, and the side wall parts of both members may be combined to form a closed space of the image capturing unit 2.

As illustrated in FIG. 2, the image capturing unit 2 may include the FPD4 serving as an X-ray detecting medium and a support 5 to which the FPD4 is attached. The image capturing unit 2 further includes a buffer material 24 and a buffer material 25 that mainly absorb the impact in a direction parallel to an X-ray incident direction.

The FPD4 includes an image receiving unit 21 where a plurality of pixels 40, which convert X-rays into electric charges and accumulate the converted electric charges, are disposed on a flat panel shaped substrate 41, a circuit board 26 on which a scanning circuit 42 or a signal processing circuit 43 described below are mounted, and a flexible circuit board 27 that connects the image receiving unit 21 and the circuit board 26.

The support 5 includes a base material 22 having a flat panel shape, a plurality of leg portions 23 that extend in a direction perpendicular to an image receiving surface of the image receiving unit 21, and an X-ray shielding material 28 that shields the circuit board 26 from X-rays.

The image capturing unit 2 is configured such that the X-ray shielding material 28, the buffer material 25, the image receiving unit 21 and the buffer material 24 are stacked on the base material 22 in this order. Therefore, the image receiving unit 21 of the FPD4 is supported by the support 5.

The buffer material 24 is provided between the ceiling plate part 31a and the image receiving unit 21 opposite to the ceiling plate part 31a. With this arrangement, the buffer material 24 mainly absorbs the impact on the ceiling plate part 31a when the impact is applied on the cassette 1, so that the impact is not directly transferred from the case 3 to the image receiving unit 21. The buffer material 24 is not adhered to the ceiling plate part 31a and may be simply disposed so as to be slightly spaced apart from the ceiling plate part 31a or pressure-welded to the ceiling plate part 31a. Meanwhile, the buffer material 24 is attached to the image receiving unit 21 by adhesion.

The image receiving unit 21 is provided between the buffer material 24 and the buffer material 25. As illustrated in FIG. 2, an outer edge 41a of the substrate 41 of the image receiving unit 21 is disposed on the inner side of an outer edge 22a of the base material 22 in a direction parallel to the image receiving surface of the image receiving unit 21. The image receiving unit 21 is attached to the buffer material 25 by adhesion.

The buffer material 25 is provided between the image receiving unit 21 and the support 5, and as illustrated in FIG. 2, provided between the image receiving unit 21 and the X-ray shielding material 28. Accordingly, the impact on the cassette 1 is hardly transferred from the image receiving unit 21. In FIG. 2, similarly to the image receiving unit 21, even though the buffer material 25 is formed to be smaller than the base material 22 in a direction parallel to the image receiving surface of the image receiving unit 21, the buffer material 25 may be formed to be larger than the base material 22. For example, the buffer material 25 may be formed to have the same size as that of the base material 22.

The X-ray shielding material 28 is provided between the buffer material 25 and the base material 22. As the X-ray shielding material 28, a heavy metal material having an excellent X-ray absorption capacity such as copper, lead, tungsten, or molybdenum may be used. Further, in FIG. 2, similarly to the image receiving unit 21, the X-ray shielding material 28 is formed to be smaller than the base material 22 in a direction parallel to the image receiving surface of the image receiving unit 21, but the X-ray shielding material 28 may be formed to be larger than the base material 22. For example, the X-ray shielding material 28 may be formed to have the same size as that of the base material 22.

The base material 22 is configured by a material having a relatively excellent rigidity. For example, considering the strength-to-weight-ratio, for example, a light metal material such as aluminum or magnesium, or a resin material such as CFRP may be used.

As illustrated in FIG. 2, the outer edge 22a of the base material 22 is disposed on the outer side of the outer edge 41a of the substrate 41 of the image receiving unit 21 in a direction parallel to the image receiving surface of the image receiving unit 21. That is, in the direction parallel to the image receiving surface of the image receiving unit 21, the base material 22 protrudes more than the substrate 41 of the image receiving unit 21. The outer edge 22a of the base material 22 is closer to the side wall part 31b of the case 3 than the outer edge 41a of the substrate 41. Further, as seen from the X-ray incident direction, the area of the base material 22 is larger than that of the substrate 41 of the image receiving unit 21.

Therefore, even though the cassette 1 is subject to an impact, since the base material 22 of the support 5 that supports the substrate 41 of the image receiving unit 21 of the FPD4 is larger than the substrate 41, the impact is not directly transferred to the image receiving unit 21. As a result, the substrate 41 of the image receiving unit 21 is hardly damaged.

The base material 22 is formed to be fitted to a bottom opening part of the case 3. In FIG. 2, the outer edge 22a of the base material 22 is in contact with the side wall part 31b of the case 3. That is, a position of the image capturing unit 2 is determined in a direction parallel to the image receiving surface of the image receiving unit 21 by the outer edge 2a of the base material 22.

As described above, the base material 22 that constitutes the support 5 functions to fix the image capturing unit 2 inside the case 3 in such a way that even though the cassette 1 is subject to impact, the FPD4 including the image receiving unit 21 is not significantly shaken inside the case 3. Further, the number of members that are used for the cassette 1 can be reduced, which makes the cassette 1 simple.

The leg portions 23 are two-dimensionally arranged to support the entire image capturing unit 2 including the image receiving unit 21 that is stacked on the base material 22, and each of the leg portions 23 is configured to have a column shape having a predetermined height (see FIG. 1A). The leg portions 23 are in contact with the back member 32 of the case 3 to determine the position of the image capturing unit 2 in a direction perpendicular to the image receiving surface of the image receiving unit 21.

As described above, the leg portions 23 constituting the support 5 function to fix the image capturing unit 2 inside the case 3 in such a way that even though the cassette 1 is subject to impact, the FPD4 including the image receiving unit 21 is not significantly shaken inside the case 3. Further, the number of members that are used for the cassette 1 is reduced, which makes the cassette 1 simple.

The leg portions 23 may also be formed of a material having a relatively excellent rigidity, similar to the base material 22. The base material 22 and the leg portions 23 are integrally formed by the compression molding.

In addition, the columnar leg portions 23 that are two-dimensionally arranged are described, but are not limited thereto. By employing a rib structure such as a partition, the circuit board 26 may be divided to be mounted in a concave portion. For example, ribs 23a may be linearly arranged (see FIG. 1B). As long as the circuit board 26 is mounted in the concave portion having a rib structure, the ribs 23a may be two-dimensionally arranged. If the rib structure is employed, the concentration of load is distributed with respect to the surface load, and as a result, the cassette 1 is hardly damaged.

The image capturing unit 2 is unfixed to the case 3, the outer edge 22a of the base material 22 of the support 5 is not adhered to the side wall part 31b of the case 3, and the leg portions 23 of the support 5 is not adhered to the back member 32 of the case 3. With this arrangement, a reworking property in the case where the image capturing unit 2 including the FPD4 is damaged is improved.

The circuit board 26 is provided in a space formed by the height of the leg portions 23 and attached to the base material 22 of the support 5 by a fastening. In other words, the support 5 supports in such a way that the image receiving unit 21 is attached to the front surface of the support 5 opposite to the ceiling plate part 31a, and the circuit board 26 on which the scanning circuit 42 and the signal processing circuit 43 or the like are mounted is attached to the rear surface of the support 5.

Figure 3A:
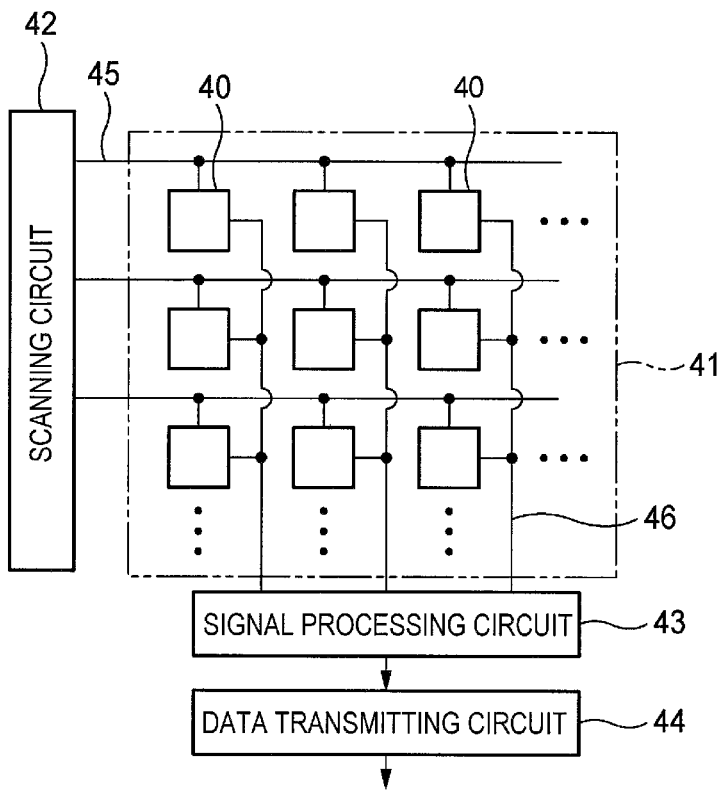
FIGS. 3A and 3B are schematic views illustrating a radiation detecting medium of the cassette of FIG. 1A.
Figure 3B:
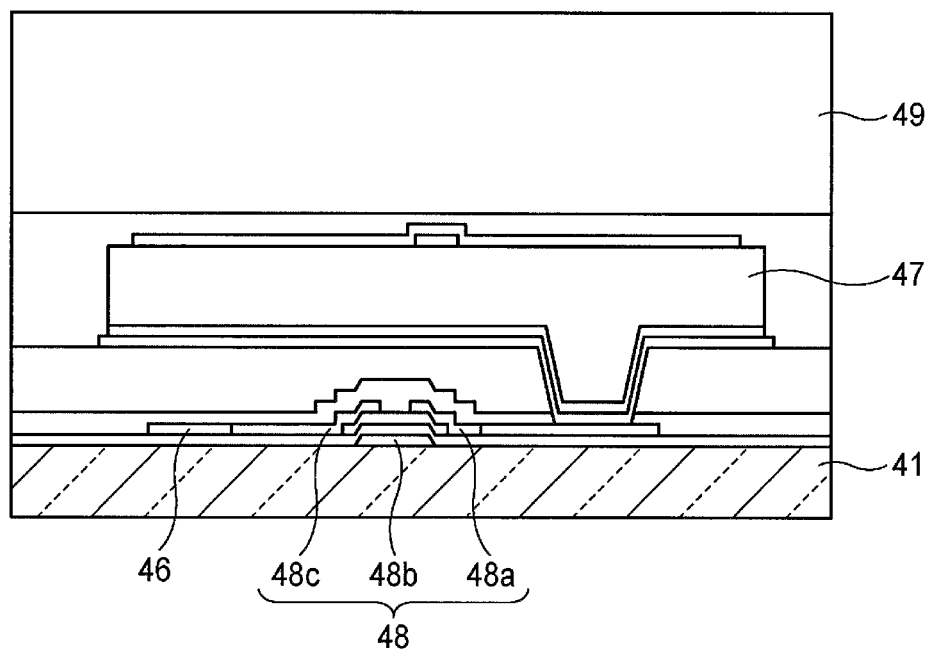

FIGS. 3A and 3B are schematic views illustrating a radiation detecting medium of the cassette of FIG. 1A. FIG. 3A illustrates the connection relationship between components, and FIG. 3B illustrates a cross-sectional view of each of the pixels.

The FPD4 includes: the image receiving unit 21 where a plurality of pixels 40, which convert X-rays into electric charges and accumulate the converted electric charges, are two-dimensionally arranged; the scanning circuit 42 that controls a read timing of electric charges from the image receiving unit 21; the signal processing circuit 43 that reads the electric charges accumulated in each of the pixels 40 and converts the read electric charges into image data for recording; and a data transmission circuit 44 that transmits the image data to an external device. The scanning circuit 42 is connected to each of the pixels by a scanning line 45 in every row, and the signal processing circuit 43 is connected to each of the pixels 40 by a signal line 46 in every column (see FIG. 3A).

Each of the pixels 40 is configured as an indirect conversion X-ray detector that converts X-rays into fluorescence first in a scintillator 49 that emits fluorescence when exposed to X-rays, and converts the converted fluorescence into electric charges in a photodiode 47 and accumulate the converted electric charges (see FIG. 3B). The scintillator 49 contains, for example, gadolinium oxide ($Gd_2O_3$), sulfated gadolinium ($Gd_2O_3S$), or cesium iodide (CsI).

The image receiving unit 21 is configured such that the scintillator 49, the photodiode 47, the TFT switching element 48, and the substrate 41 are arranged in this order from the X-ray incident side.

The photodiode 47 is formed on the substrate 41 where an active matrix thin film transistor (TFT) array is formed. Specifically, the image receiving unit 21 has a stacked structure in which the thin film transistor array is formed on the substrate 41 and the photodiode 47 is stacked thereon (see FIG. 3B).

In each of the TFT switching elements 48 that configure the TFT array, a gate electrode 48b of the TFT switching element is connected to the scanning line 45, a source electrode thereof 48a is connected to the photodiode 47, and a drain electrode thereof 48c is connected to the signal line 46. Once the TFT switching element 48 is turned ON by a driving pulse from the scanning circuit 42, the electric charge accumulated in the photodiode 47 is read out to the signal line 46.

The signal processing circuit 43 is constituted with an integral amplification circuit, an A/D converter, a correction circuit, and a video memory (all of them not illustrated). The integral amplification circuit integrates the electric charges output via the signal line 46 from each of the pixels 40, converts the electric charges into a voltage signal (image signal), and inputs the converted voltage signal to the AID converter. The A/D converter converts the input image signal into digital image data to input the digital image data to the correction circuit. The correction circuit performs a correction such as an offset correction or a gain correction to the image data and stores the corrected image data in the video memory.

Each of the pixels 40 may be configured as a direct-conversion element that directly converts X-rays into electric charges in a conversion layer such as amorphous selenium to thereby accumulate the converted electric charges in a capacitor connected to an electrode in a lower portion of the conversion layer.

From the viewpoint of increasing the area of the photodiode 47 in order to increase a light receiving rate of one pixel, the FPD4 adopts a so-called double layered structure where the switching element 48 is provided on a separate layer from the photodiode 47. However, the structure of the FPD4 is not limited thereto, and a structure in which the switching element and the photodiode are provided on the same layer may be adopted.

Each of the pixels 40, the scanning circuit 42, the signal processing circuit 43 and the data transmission circuit 44 as described above are supplied with an operating power from a power supply part (not illustrated) including a battery pack. Wires connecting the power supply part with each of the pixels 40, the scanning circuit 42, the signal processing circuit 43 and the data transmission circuit 44 are not illustrated.

As described above, according to the cassette 1, when the cassette 1 is subject to an impact, since the base material 22 of the support 5 that supports the substrate 41 of the image receiving unit 21 of the FPD4 is formed to be larger than the substrate 41, the impact is not directly transferred to the image receiving unit 21 so that the substrate 41 of the image receiving unit 21 is hardly damaged. In other words, by taking a measure for the weakness to impact caused by the shape of the cassette 1, it is possible to obtain a cassette having an enhanced impact resistance.

Since the image receiving unit 21 has a stacked structure where the photodiode 47 is stacked on the upper side of the switching element 48, the image receiving unit 21 may be weakened by the impact transmitted from the side wall part 31*b* of the case. For this reason, the advantageous effect obtained by using the above-described configuration is significant.

If cesium iodide (CsI) is used as a fluorescence material for the scintillator 49 of the image receiving unit 21, the scintillator 49 becomes weaker as compared with the case of using other fluorescent materials, and as a result, the advantageous effect obtained by using the above-described configuration is significant.

Next, with reference to FIGS. 4 to 8, a modified example of the cassette 1 will be described. A component having the same function as the cassette 1 is denoted by the same reference numeral and the description thereof will be omitted.

Figure 4:
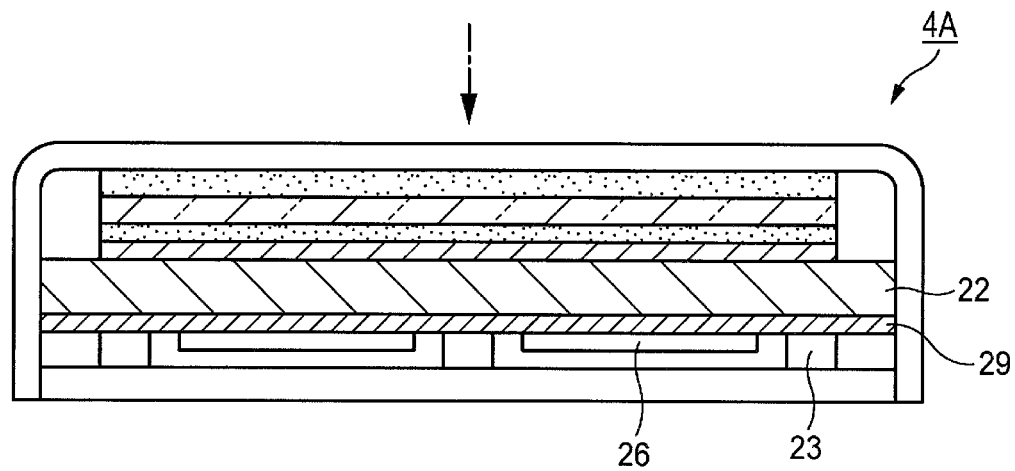
FIG. 4 is a cross-sectional view schematically illustrating the configuration of another example of the cassette of FIG. 1A.

FIG. 4 is a cross-sectional view schematically illustrating the configuration of another example of the cassette of FIG. 1A.

A cassette 4A is different from the cassette 1 in that the support 5 further includes a thermal dispersing member 29.

The thermal dispersing member 29 is provided between the base material 22 and the leg portions 23. Therefore, the leg portions 23 are attached to the thermal dispersing member 29 and the circuit board 26 is also attached to the thermal dispersing member 29 by fastening. The thermal dispersing member 29 is configured, for example, by a thin metallic plate.

As described above, by providing the thermal dispersing member 29, it is possible to disperse the heat generated from the circuit board 26 throughout the entire image capturing unit 2 including the FPD 4, and as a result, the cassette 4A can stably operate for a longer time.

Figure 5A:
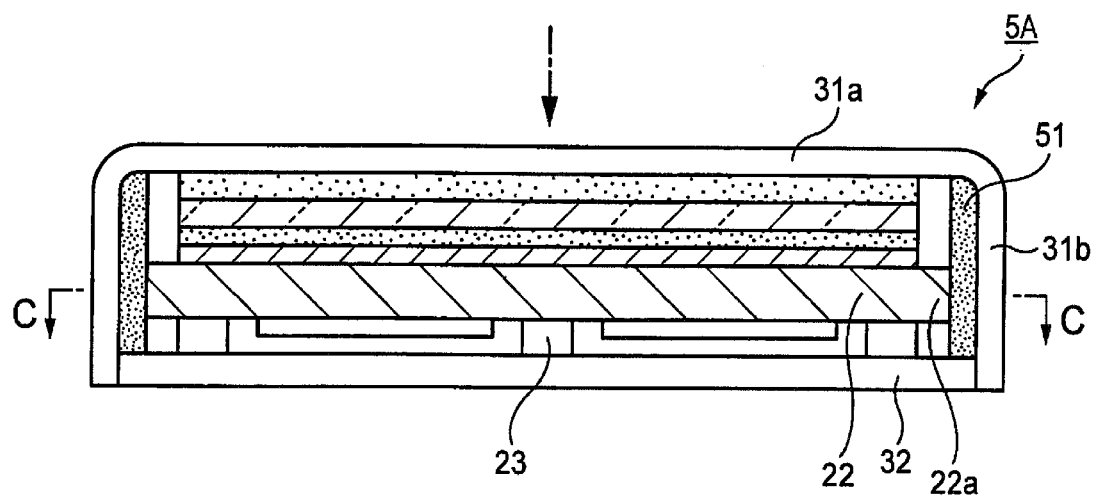
FIGS. 5A and 5B are schematic views illustrating the configuration of another example of the cassette of FIG. 1A.
Figure 5B:
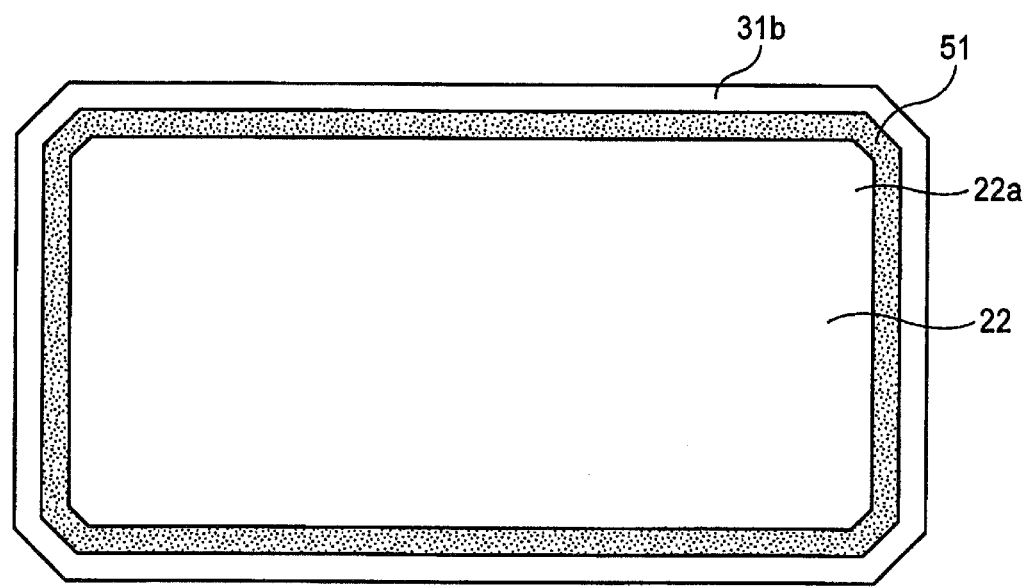

FIGS. 5A and 5B are schematic views illustrating the configuration of another example of the cassette of FIG. 1A. FIG. 5A illustrates a cross-sectional view of the cassette and FIG. 5B illustrates a cross-sectional view of the cassette taken along the line C-C.

A cassette 5A is different from the cassette 1 in that a buffer material 51 is interposed between a base material 22 of a support 5 and a side wall part 31*b* of a case 3.

The buffer material 51 is provided between the base material 22 of the support 5 and the side wall part 31*b* of the case 3 (see FIG. 5A) and configured to enclose the entire circumference of the outer edge 22*a* of the base material 22 (see FIG. 5B). The base material 22 may be in contact with the buffer material 51 or embedded in the buffer material 51 toward the outside.

As described above, by providing the buffer material 51, the impact on the cassette 5A is hardly transferred even to the support 5. Therefore, it is possible to lower the possibility of damage of the substrate 41 of the image receiving unit 21.

Figure 6A:
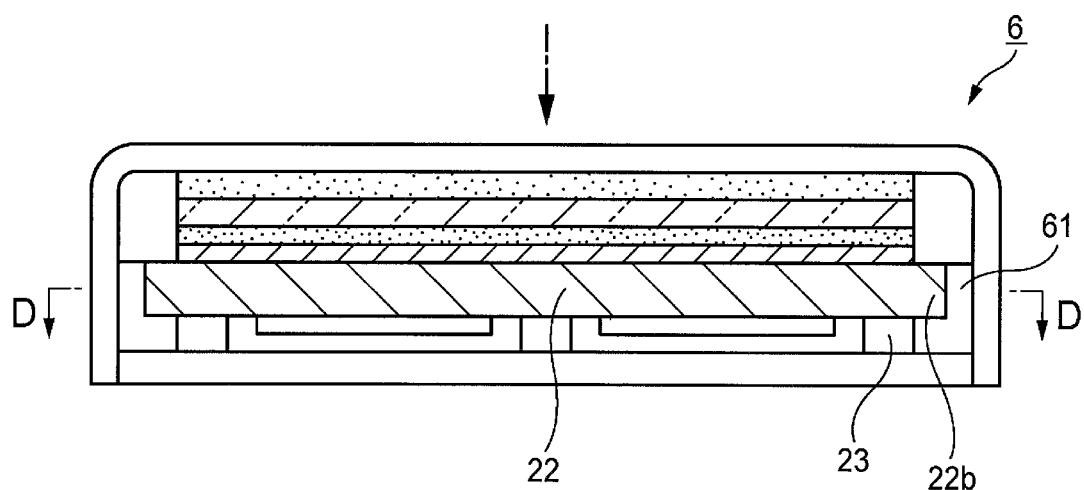
FIGS. 6A and 6B are schematic views illustrating the configuration of another example of the cassette of FIG. 1A.
Figure 6B:
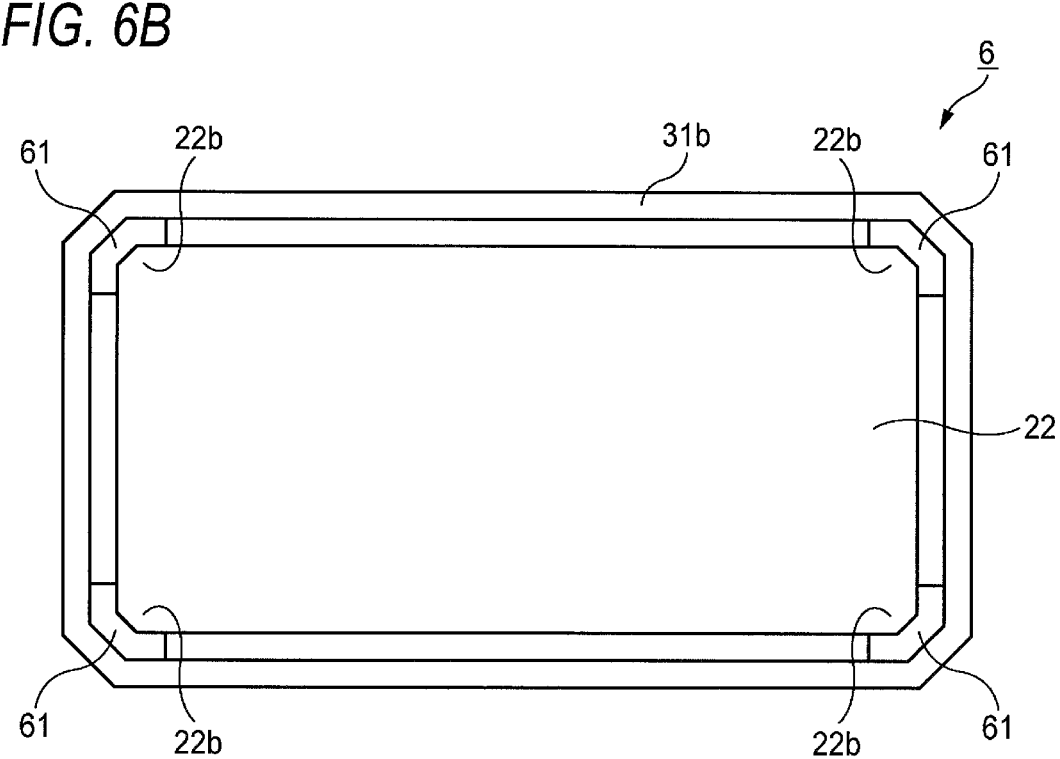

FIGS. 6A and 6B are schematic views illustrating the configuration of another example of the cassette of FIG. 1A. FIG. 6A illustrates a cross-sectional view of the cassette, and FIG. 6B illustrates a cross-sectional view of the cassette taken along the line C-C.

A cassette 6 is different from the cassette 1 in that a plurality of positioning members 61 are interposed between a base material 22 of a support 5 and a side wall part 31*b* of a case 3.

Each of the positioning members 61 is formed to correspond to the four corner portions 22*b* of the base material 22. Each of the positioning members 61 is formed to be fitted to the shapes of the corresponding corner portions 22*b* and support the corresponding corner portions 22*b*. For example, as illustrated in FIGS. 6A and 6B, each of the positioning members 61 has an L-shaped cross-section, and the bottom part of the L-shaped cross-section has substantially the same height as the height of each of the leg portions 23. The positioning members 61, for example, are configured by a resin or an elastic body.

Each of the positioning members 61 is in contact with the side wall part 31*b* of the case 3 and the back member 32. When the image capturing unit 2 is accommodated in the case 3, the positioning member 61 may be adhered to the image capturing unit 2 or the case 3. However, from the viewpoint of reworking property, the positioning member 61 is not preferably adhered to the image capturing unit 2 or the case 3.

As described above, by providing the positioning member 61, at least the image capturing unit 2 may be positioned in the direction perpendicular to the image receiving surface of the image receiving unit 21. Specifically, when a user wants to minutely adjust the position of the image capturing unit 2, it is possible to easily adjust the position of the image capturing unit 2 by adjusting only the positioning member 61.

Figure 7:
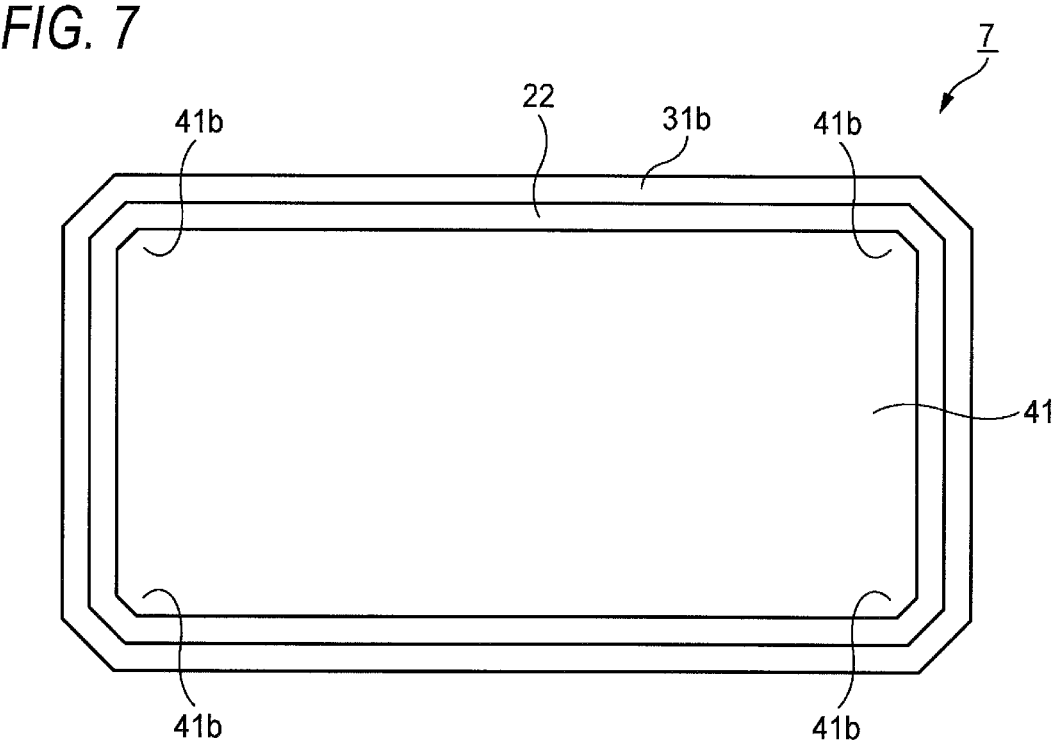
FIG. 7 is a schematic view illustrating the configuration of another example of the cassette of FIG. 1A.

FIG. 7 is a schematic view illustrating the configuration of another example of the cassette of FIG. 1A.

A cassette 7 is different from the cassette 1 in that the four corner portions of the substrate 41 are chamfered.

In the cassette 1, the substrate 41 is a rectangle as seen from the X-ray incident direction. Therefore, the corner portions of the substrate 41 are acute-angled, and thus the corner portions can be easily damaged.

Therefore, in the cassette 7, the four corner portions of the substrate 41 are, for example, cut to have a predetermined size in a direction perpendicular to the image receiving surface of the image receiving unit 21 to form the chamfered corner portions 41*b*. As seen from the X-ray incident direction, the chamfered corner portions 41*b* have at least two obtuse angles.

As described above, by forming the chamfered corner portions 41*b*, the impact resistance of the cassette 1 can be improved.

Figure 8:
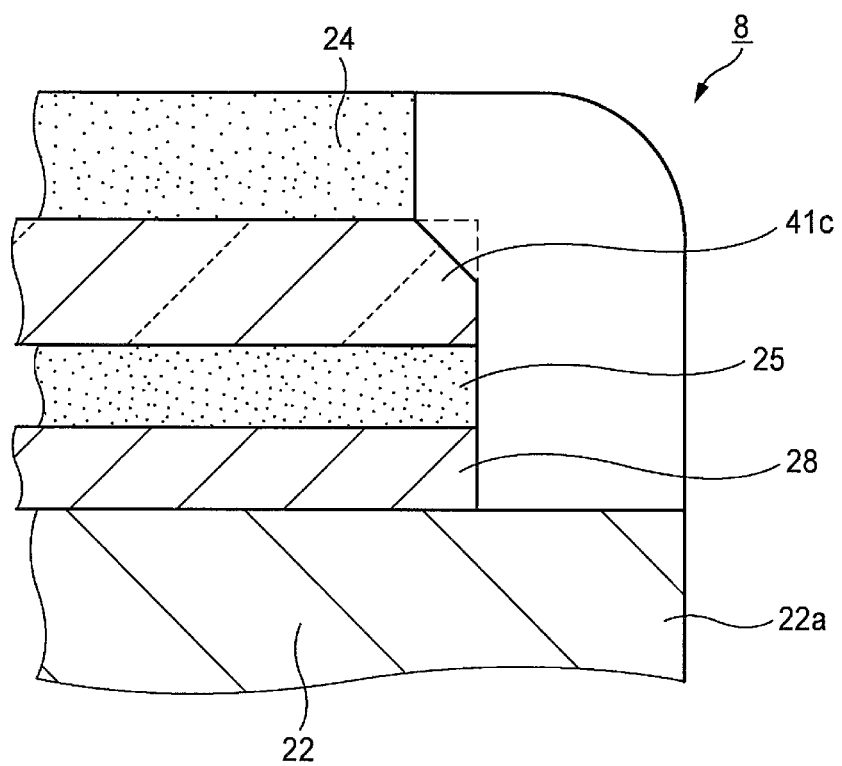
FIG. 8 is an enlarged cross-sectional view schematically illustrating the configuration of another example of the cassette of FIG. 1A.

FIG. 8 is an enlarged cross-sectional view schematically illustrating the configuration of another example of the cassette of FIG. 1A.

A cassette 8 is different from the cassette 1 in that an outer edge 41*a* of the substrate 41 is chamfered.

In the cassette 1, the substrate 41 is a rectangle as seen from the X-ray incident direction.

Therefore, a portion of the outer edge 41a of the substrate 41 that includes an upper side that forms a surface opposite to the ceiling plate part 31a of the case 3 forms an acute angle (please refer to a portion indicated by the dotted line in FIG. 8). Therefore, this portion can be easily damaged.

For this reason, in the cassette 8, a chamfered upper side portion 41c is formed in which the portion of the outer edge 41a of the substrate 41 including the upper side that forms the surface opposite to the ceiling plate part 31a of the case 3 is chamfered.

As a cross section of the substrate 41, the chamfered upper side portion 41c has a shape having at least two obtuse angles.

As described above, by forming the chamfered upper side portion 41c, the impact resistance of the cassette 1 can be improved.

In the above description, even though the modified example of the cassette 1 has been described with reference to FIGS. 4 to 8, the modified portion of the cassette 1 may be appropriately combined and thereby used.

Even though it is described that a conventional X-ray is used as radiation, the present invention is not limited thereto, and radiation other than X-rays such as α-rays or γ-rays may be used.

As described above, the present specification discloses a cassette of the following (1) to (16).

(1) A cassette including: an image capturing unit including: an image receiving unit having a flat panel shape on which a plurality of pixels are arranged on a substrate converting radiation into electric charges and accumulating the converted electric charges; and a support to which the image receiving unit is attached; and a case in which the image capturing unit is accommodated in an unfixed state, in which the support supports the image receiving unit, and an outer edge of the support is disposed on an outer side of an outer edge of the substrate of the image receiving unit in a direction parallel to an image receiving surface of the image receiving unit.

(2) The cassette according to (1), in which the support includes leg portions that are in contact with a bottom of the case to determine a position of the image capturing unit in a direction perpendicular to the image receiving surface of the image receiving unit.

(3) The cassette according to (2), in which the leg portions are in close contact with the bottom of the case in a non-adhesive manner.

(4) The cassette according to (2), in which the support includes a thermal dispersing member to which a circuit board that controls the pixels of the image receiving unit is adhered, and the leg portions are attached to the thermal dispersing member.

(5) The cassette according to (1), in which a position of the image capturing unit is determined by the outer edge of the support in a direction parallel to the image receiving surface of the image receiving unit.

(6) The cassette according to (1), further including: a positioning member configured to correspond to each of a corner portions of the support and provided between the support and a side wall part of the case, in which a position of the image capturing unit is determined by the positioning member in a direction parallel to the image receiving surface of the image receiving unit.

(7) The cassette according to (1), in which the image capturing unit includes a first buffer material between a ceiling plate part of the case and the image receiving unit opposite thereto.

(8) The cassette according to (1), in which the image capturing unit includes a second buffer material between the image receiving unit and the support.

(9) The cassette according to (1), further including: a third buffer material provided between the outer edge of the support and a side wall part of the case and configured to enclose the entire circumference of the outer edge of the support.

(10) The cassette according to (1), in which the outer edge of the substrate of the image receiving unit is chamfered.

(11) The cassette according to (1), in which a plurality of corner portions of the substrate of the image receiving unit are chamfered.

(12) The cassette according to (1), in which the substrate of the image receiving unit is formed of glass.

(13) The cassette according to (1), in which each of the pixels of the image receiving unit includes a photoelectric converting unit and a switching element, and the photoelectric converting unit is stacked on an upper side of the switching element.

(14) The cassette according to (1), in which each of the pixels is configured to emit fluorescence when exposed to radiation, and convert the fluorescent from a scintillator containing a fluorescent material into electric charges and accumulate the converted electric charges.

(15) The cassette according to (14), in which the image receiving unit is parallel to the scintillator and the substrate in this order from a radiation incident side.

(16) The cassette according to (14), in which the scintillator contains cesium iodide (CsI) as the fluorescent material.

What is claimed is:

1. A cassette, comprising:
an image capturing unit including :
    an image receiving unit having a flat panel shape on which a plurality of pixels are arranged on a substrate converting radiation into electric charges and accumulating the converted electric charges; and
    a support to which the image receiving unit is attached; and
a case in which the image capturing unit is accommodated in an unfixed state,
wherein the support supports the image receiving unit,
an outer edge of the support is disposed on an outer side of an outer edge of the substrate of the image receiving unit in a direction parallel to an image receiving surface of the image receiving unit,
the support includes leg portions that are in contact with a bottom of the case to determine a position of the image capturing unit in a direction perpendicular to the image receiving surface of the image receiving unit, and
the support includes a thermal dispersing member to which a circuit board that controls the pixels of the image receiving unit is adhered, and the leg portions are attached to the thermal dispersing member.

2. The cassette according to claim 1, wherein
the leg portions are in close contact with the bottom of the case in a non-adhesive manner.

3. The cassette according to claim 1, wherein
a position of the image capturing unit is determined by the outer edge of the support in a direction parallel to the image receiving surface of the image receiving unit.

4. The cassette according to claim 1, further comprising:
a positioning member configured to correspond to each of a corner portions of the support and provided between the support and a side wall part of the case, wherein a position of the image capturing unit is determined by the positioning member in a direction parallel to the image receiving surface of the image receiving unit.

5. The cassette according to claim 1, wherein the image capturing unit includes buffer material between a ceiling plate part of the case and the image receiving unit opposite thereto.

6. The cassette according to claim 1, wherein the image capturing unit includes a buffer material between the image receiving unit and the support.

7. The cassette according to claim 1, further comprising:
a buffer material provided between the outer edge of the support and a side wall part of the case and configured to enclose the entire circumference of the outer edge of the support.

8. A cassette, comprising:
an image capturing unit including:
   an image receiving unit having a flat panel shape on which a plurality of pixels are arranged on a substrate converting radiation into electric charges and accumulating the converted electric charges; and
   a support to which the image receiving unit is attached; and
a case in which the image capturing unit is accommodated in an unfixed state,
wherein the support supports the image receiving unit,
an outer edge of the support is disposed on an outer side of an outer edge of the substrate of the image receiving unit in a direction parallel to an image receiving surface of the image receiving unit, and
the outer edge of the substrate of the image receiving unit is chamfered.

9. A cassette, comprising:
an image capturing unit including:
   an image receiving unit having a flat panel shape on which a plurality of pixels are arranged on a substrate converting radiation into electric charges and accumulating the converted electric charges; and
   a support to which the image receiving unit is attached; and
a case in which the image capturing unit is accommodated in an unfixed state,
wherein the support supports the image receiving unit,
an outer edge of the support is disposed on an outer side of an outer edge of the substrate of the image receiving unit in a direction parallel to an image receiving surface of the image receiving unit, and
a plurality of corner portions of the substrate of the image receiving unit are chamfered.

10. The cassette according to claim 1, wherein the substrate of the image receiving unit is formed of glass.

11. The cassette according to claim 1, wherein each of the pixels of the image receiving unit includes a photoelectric converting unit and a switching element, and the photoelectric converting unit is stacked on an upper side of the switching element.

12. The cassette according to claim 1, wherein each of the pixels is configured to emit fluorescence when exposed to radiation, and convert the fluorescent from a scintillator containing a fluorescent material into electric charges and accumulate the converted electric charges.

13. The cassette according to claim 12, wherein the image receiving unit is parallel to the scintillator and the substrate in this order from a radiation incident side.

14. The cassette according to claim 12, wherein the scintillator contains cesium iodide (CsI) as the fluorescent material.

* * * * *